US012774104B2

(12) United States Patent
Gariepy et al.

(10) Patent No.: US 12,774,104 B2
(45) Date of Patent: Oct. 27, 2026

(54) BATTERY CONTACTORS AND CONTACTOR CONTROL SYSTEMS FOR AIRCRAFT BATTERIES

(71) Applicant: Pratt & Whitney Canada Corp., Longueuil (CA)

(72) Inventors: Raphael Gariepy, Montreal (CA); Fraz Ahmad Kharal, Brampton (CA); Antwan Shenouda, Mississauga (CA); Remi Robache, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/962,566

(22) Filed: Nov. 27, 2024

(65) Prior Publication Data

US 2026/0145803 A1 May 28, 2026

(51) Int. Cl.

*B64D 27/34* (2024.01)
*B64D 31/06* (2024.01)
*B64D 31/16* (2024.01)
*H01M 10/42* (2006.01)
*H01M 10/48* (2006.01)
*H01M 50/502* (2021.01)

(52) U.S. Cl.

CPC ............ *B64D 31/16* (2024.01); *B64D 31/06* (2013.01); *H01M 10/425* (2013.01);
(Continued)

(58) Field of Classification Search

CPC .... B64D 31/16; B64D 31/06; B64D 2221/00; B64D 27/357; B64D 31/18; H01M 10/425; H01M 10/482; H01M 50/502; H01M 2010/4271; H01M 2010/4278; H01M 2220/20; H01M 10/441; H01M 10/486;
(Continued)

(56) References Cited

U.S. PATENT DOCUMENTS

RE49,043 E 4/2022 Schwellnus
11,828,813 B2 11/2023 Kurtz
(Continued)

FOREIGN PATENT DOCUMENTS

CN 110034594 B 9/2023
EP 3876333 A1 9/2021
(Continued)

OTHER PUBLICATIONS

EP Search Report for EP Patent Application No. 25219022.8 dated May 7, 2026.

*Primary Examiner* — Daniel M. Robert
(74) *Attorney, Agent, or Firm* — Getz Balich LLC

(57) ABSTRACT

A propulsion system for an aircraft includes a battery, an electrical distribution system, a first control channel, and a second control channel. The battery includes a plurality of battery strings. The electrical distribution system includes at least one string contactor for each of the plurality of battery strings. The at least one string contactor includes a first gate connected to the first control channel and a second gate connected to the second control channel. The at least one string contactor is operable to a closed position with a first control signal present at the first gate and a second control signal present at the second gate. The at least one string contactor is operable to an open position with one or both of the first control signal absent at the first gate or the second control signal absent at the second gate.

14 Claims, 7 Drawing Sheets

(52) U.S. Cl.
CPC ....... *H01M 10/482* (2013.01); *H01M 50/502* (2021.01); *B64D 2221/00* (2013.01); *H01M 2010/4271* (2013.01); *H01M 2010/4278* (2013.01); *H01M 2220/20* (2013.01)

(58) Field of Classification Search
CPC ............. H01M 50/204; H01M 50/249; H01M 50/269; H01M 50/574; H01M 50/581; H01M 2200/10; G01R 31/385; H02J 7/80; H02J 7/933; G01K 1/026; G01K 1/14; G01K 3/005; G01K 3/14
See application file for complete search history.

(56) References Cited

U.S. PATENT DOCUMENTS

| | | | | |
|---|---|---|---|---|
| 11,848,580 | B2 | 12/2023 | Tenorio | |
| 11,933,852 | B2 | 3/2024 | Weinreiter | |
| 11,967,842 | B2 | 4/2024 | Khozikov | |
| 2015/0115736 | A1* | 4/2015 | Snyder | H02J 7/54 307/115 |
| 2016/0226107 | A1* | 8/2016 | Worry | H01M 10/482 |
| 2016/0261127 | A1* | 9/2016 | Worry | H01M 10/4207 |
| 2022/0094297 | A1* | 3/2022 | Lacaux | B64D 27/357 |
| 2022/0119121 | A1* | 4/2022 | Lacaux | H02K 7/14 |
| 2022/0299569 | A1* | 9/2022 | Kurtz | H01M 10/425 |
| 2024/0113513 | A1* | 4/2024 | Syed | F02C 9/48 |
| 2024/0308350 | A1 | 9/2024 | Gariepy | |
| 2025/0260076 | A1* | 8/2025 | Colak | H01M 10/482 |

FOREIGN PATENT DOCUMENTS

| | | | | | |
|---|---|---|---|---|---|
| EP | 4134269 | A1 | | 2/2023 | |
| EP | 4415216 | A1 | | 8/2024 | |
| KR | 20140093125 | A | * | 7/2014 | B60L 58/10 |

* cited by examiner

BATTERY CONTACTORS AND CONTACTOR CONTROL SYSTEMS FOR AIRCRAFT BATTERIES

TECHNICAL FIELD

This disclosure relates generally to aircraft electrical systems including batteries and, more particularly, to electric contactors and control systems for electrical contactors.

BACKGROUND OF THE ART

Propulsion system architectures for aircraft, such as hybrid-electric propulsion systems, may typically include one or more electrical assemblies configured to support various functions of the propulsion system and an associated aircraft. These electrical assemblies may frequently include batteries configured to provide electrical power for various electrical loads of the aircraft and its propulsion system(s). Various systems and methods for controlling electrical current flow for these batteries are known. While these known systems and methods may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes a battery, an electrical distribution system, a first control channel, and a second control channel. The battery includes a plurality of battery strings. Each of the plurality of battery strings includes a plurality of battery cells. The electrical distribution system includes a battery string switch assembly. The battery string switch assembly is operable to electrically interconnect each of the plurality of battery strings together in parallel. The battery switch assembly includes at least one string contactor for each of the plurality of battery strings. The at least one string contactor is positionable in an open position and a closed position. The at least one string contactor includes a gate assembly including a first gate and a second gate. The at least one string contactor is operable to the closed position with a first control signal present at the first gate and a second control signal present at the second gate. The at least one string contactor is operable to the open position with one or both of the first control signal absent at the first gate or the second control signal absent at the second gate. The first control channel forms a portion of a first control lane connected in signal communication with the first gate. The first control channel is operable to selectively apply the first control signal to the first gate. The second control channel forms a portion of a second control lane, independent of the first control lane, connected in signal communication with the second gate. The second control channel is operable to selectively apply the second control signal to the second gate.

In any of the aspects or embodiments described above and herein, the propulsion system may further include a battery management system (BMS) controller and an engine controller, the BMS controller may include the first control channel and the second control channel, the engine controller may include a third control channel and a fourth control channel, the first control channel may be connected in signal communication with the third control channel to further form the first control lane, and the second control channel may be connected in signal communication with the fourth control channel to further form the second control lane.

In any of the aspects or embodiments described above and herein, the propulsion system may further include a single-channel battery management system (BMS) controller and an engine controller, the single-channel BMS controller may include the first control channel, the engine controller may include the second control channel and a third control channel, and the first control channel may be connected in signal communication with the third control channel to further form the first control lane.

In any of the aspects or embodiments described above and herein, the propulsion system may further include an override system, the gate assembly may include a third gate connected in signal communication with the override system, and the override system may be operable to selectively apply a third control signal to the third gate.

In any of the aspects or embodiments described above and herein, the at least one string contactor may be operable to the open position with the third control signal present at the third gate independent of the first control signal and the second control signal present or absent at the first gate and the second gate, respectively.

In any of the aspects or embodiments described above and herein, each of the plurality of battery strings may include a positive string line and a negative string line and, for each of the plurality of battery strings, the at least one string contactor may include a positive string contactor at the positive string line and a negative string contactor at the negative string line.

In any of the aspects or embodiments described above and herein, the propulsion system may further include a battery sensor assembly for the battery, the battery sensor assembly may include a first subset of battery sensors and a second subset of battery sensors, the first subset of battery sensors may be connected in signal communication with the first control channel and further forming the first control lane, the second subset of battery sensors may be connected in signal communication with the second control channel and further forming the second control lane.

In any of the aspects or embodiments described above and herein, each of the first control channel and the second control channel may include a processing system, the processing system may include a processor connected in signal communication with a non-transitory memory storing instructions which, when executed by the processor, may cause the processor to for the first control channel, identify a battery fault of a first battery string of the plurality of battery strings using the first subset of battery sensors and, in response to identification of the battery fault, remove the first control signal from the first gate of the at least one string contactor of the first battery string, and for the second control channel, identify a battery fault of the first battery string of the plurality of battery strings using the second subset of battery sensors and, in response to identification of the battery fault, remove the second control signal from the second gate of the at least one string contactor of the first battery string.

In any of the aspects or embodiments described above and herein, each of the first subset of battery sensors and the second subset of battery sensors may include a temperature sensor, a voltage sensor, and a current sensor for each of the plurality of battery strings.

In any of the aspects or embodiments described above and herein, the propulsion system may further include a propulsor and an electric motor, the electric motor may be coupled with the propulsor, and the electrical distribution system may be configured to electrically interconnect the electric motor with the battery.

According to another aspect of the present disclosure, a propulsion system for an aircraft includes a battery, an electrical distribution system, a battery management system, and a second control channel. The battery includes a plurality of battery strings. Each of the plurality of battery strings includes a plurality of battery cells. The electrical distribution system includes a battery string switch assembly. The battery string switch assembly is operable to electrically interconnect each of the plurality of battery strings together in parallel. The battery switch assembly includes at least one string contactor for each of the plurality of battery strings. The at least one string contactor is positionable in an open position and a closed position. The at least one string contactor includes a gate assembly including a first gate and a second gate. The at least one string contactor is operable to the closed position with a first control signal present at the first gate and a second control signal present at the second gate. The at least one string contactor is operable to the open position with one or both of the first control signal absent at the first gate or the second control signal absent at the second gate. The battery management system includes a battery management system (BMS) controller and a battery sensor assembly. The BMS controller includes a first control channel. The first control channel and the battery sensor assembly form a portion of a first control lane connected in signal communication with the first gate. The first control channel is operable to selectively apply the first control signal to the first gate. The second control channel and the battery sensor assembly form a portion of a second control lane connected in signal communication with the second gate. The second control channel is operable to selectively apply the second control signal to the second gate.

In any of the aspects or embodiments described above and herein, the propulsion system may further include an engine controller, the BMS controller may further include the second control channel, the engine controller may include a third control channel and a fourth control channel, the first control channel may be connected in signal communication with the third control channel to further form the first control lane, and the second control channel may be connected in signal communication with the fourth control channel to further form the second control lane.

In any of the aspects or embodiments described above and herein, the propulsion system may further include an engine controller, the BMS controller may be a single-channel controller, the engine controller may include the second control channel and a third control channel, and the first control channel may be connected in signal communication with the third control channel to further form the first control lane.

In any of the aspects or embodiments described above and herein, the propulsion system may further include an override system, the gate assembly may include a third gate connected in signal communication with the override system, and the override system may be operable to selectively apply a third control signal to the third gate.

In any of the aspects or embodiments described above and herein, the at least one string contactor may be operable to the open position with the third control signal present at the third gate independent of the first control signal and the second control signal present or absent at the first gate and the second gate, respectively.

According to another aspect of the present disclosure, a propulsion system for an aircraft includes a propulsor, an electric motor, a battery, an electrical distribution system, a first control channel, and a second control channel. The electric motor is coupled with the propulsor. The battery includes a plurality of battery strings. Each of the plurality of battery strings includes a plurality of battery cells. The electrical distribution system is operable to electrically interconnect the battery with the electric motor. The electrical distribution system includes a battery string switch assembly. The battery string switch assembly is operable to electrically interconnect each of the plurality of battery strings with the electric motor. The battery switch assembly includes at least one string contactor for each of the plurality of battery strings. The at least one string contactor is positionable in an open position and a closed position. The at least one string contactor includes a gate assembly including a first gate and a second gate. The at least one string contactor is operable to the closed position with a first control signal present at the first gate and a second control signal present at the second gate. The at least one string contactor is operable to the open position with one or both of the first control signal absent at the first gate or the second control signal absent at the second gate. The first control channel forms a portion of a first control lane connected in signal communication with the first gate. The first control channel is operable to selectively apply the first control signal to the first gate. The second control channel forms a portion of a second control lane, independent of the first control lane, connected in signal communication with the second gate. The second control channel is operable to selectively apply the second control signal to the second gate.

In any of the aspects or embodiments described above and herein, the propulsion system may further include an engine controller including a third control channel and a fourth control channel, the first control channel may be connected in signal communication with the third control channel to further form the first control lane, and the second control channel may be connected in signal communication with the fourth control channel to further form the second control lane.

In any of the aspects or embodiments described above and herein, the propulsion system may further include an engine controller and a battery management system (BMS) controller, the BMS controller may be a single-channel controller including the first control channel, the engine controller may include the second control channel and a third control channel, and the first control channel may be connected in signal communication with the third control channel to further form the first control lane.

In any of the aspects or embodiments described above and herein, the propulsion system may further include an override system, the gate assembly may include a third gate connected in signal communication with the override system, and the override system may be operable to selectively apply a third control signal to the third gate.

In any of the aspects or embodiments described above and herein, the at least one string contactor may be operable to the open position with the third control signal present at the third gate independent of the first control signal and the second control signal present or absent at the first gate and the second gate, respectively.

The present disclosure, and all its aspects, embodiments and advantages associated therewith will become more readily apparent in view of the detailed description provided below, including the accompanying drawings.

DETAILED DESCRIPTION

Figure 1:
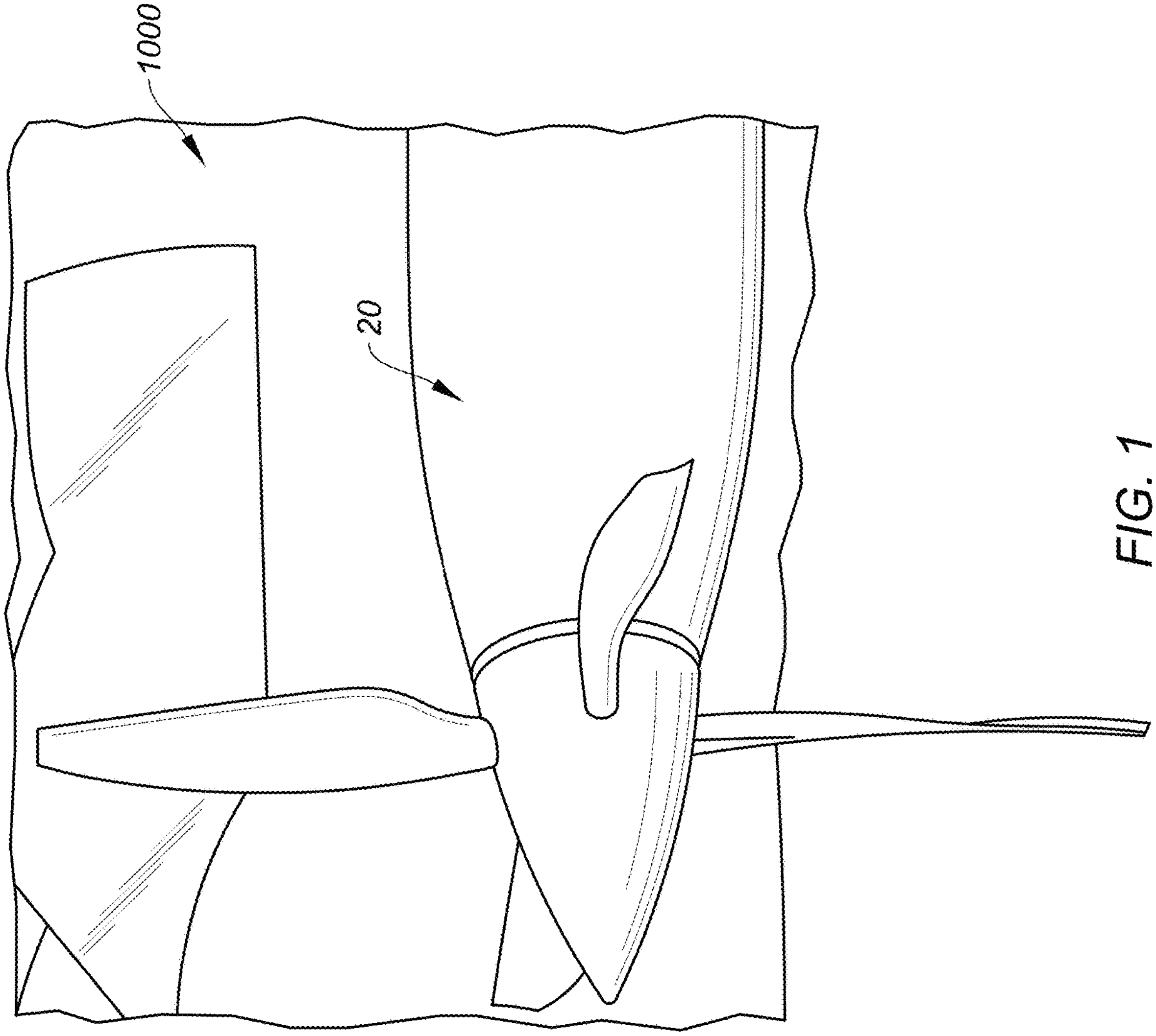
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
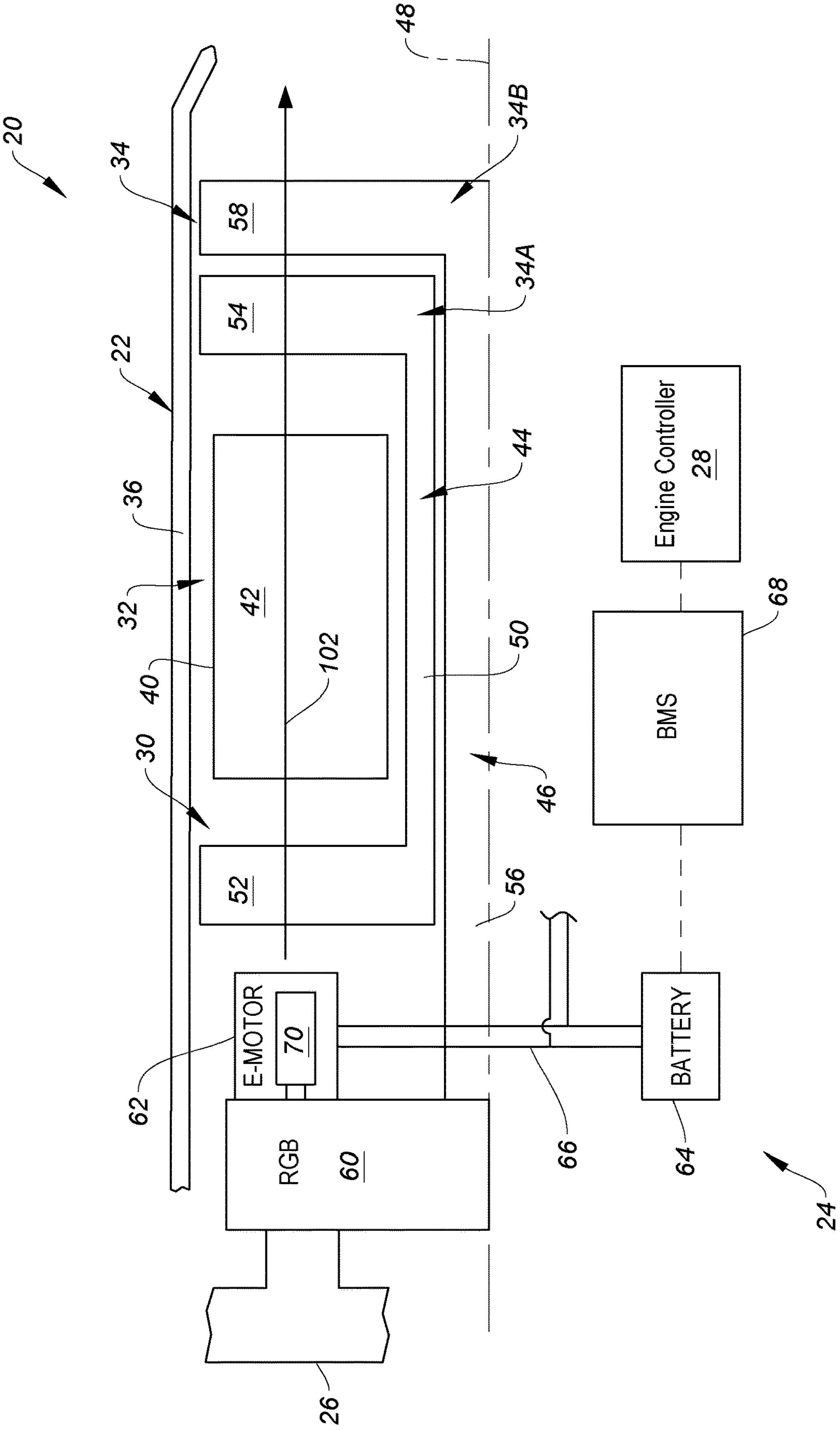
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, an electrical assembly 24, a propulsor 26, and an engine controller 28. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The engine 22 of FIG. 2 includes a compressor section 30, a combustor section 32, a turbine section 34, and an engine static structure 36. The combustor section 32 includes a combustor 40 (e.g., an annular combustor). The combustor 40 forms a combustion chamber 42. The turbine section 34 includes a high-pressure turbine section 34A and a power turbine section 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed first turbine rotor 54 for the high-pressure turbine section 34A. The first shaft 50 interconnects the bladed compressor rotor 52 and the bladed first turbine rotor 54.

The second rotational assembly 46 of FIG. 2 includes a second shaft 56 and a bladed second turbine rotor 58 for the power turbine section 34B. The second shaft 56 is connected to the bladed second turbine rotor 58. The second shaft 56 operably connects (e.g., directly or indirectly connects) the bladed second turbine rotor 58 with the propulsor 26. For example, the second shaft 56 of FIG. 2 is coupled with the propulsor 26 by a gear box 60 (e.g., a reduction gear box (RGB)). The gear box 60 includes a gear assembly (e.g., an epicyclic gear assembly) coupling the second shaft 56 and the propulsor 26. The gear assembly may be a reduction gear assembly configured to drive rotation of the propulsor 26 at a reduced rotational speed relative to the second shaft 56. Of course, the second shaft 56 may alternatively be directly connected to the propulsor 26 to drive the propulsor 26 at the same rotational speed as the second shaft 56.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46.

The electrical assembly 24 of FIG. 2 includes an electric motor 62, a battery 64, an electrical distribution system 66, and a battery management system (BMS) 68.

The electric motor 62 is electrically connected to the electrical distribution system 66. The electric motor 62 includes a rotor 70. The rotor 70 is coupled to the propulsor 26 by the gear box 60. For example, the gear box 60 may couple both of the second shaft 56 and the rotor 70 to the propulsor 26 to facilitate driving rotation of the propulsor 26 with the bladed second turbine rotor 58 (e.g., via the second shaft 56), the electric motor 62 (e.g., the rotor 70), or a combination of the bladed second turbine rotor 58 and the electric motor 62. The electric motor 62 may additionally include a motor control unit (e.g., an inverter) configured to control electric power characteristics (e.g., frequency, voltage, current) supplied to the electric motor 62 (e.g., windings of the electric motor 62), for example, to control a rotation speed and/or torque of the rotor 70.

The battery 64 is electrically connected to the electrical distribution system 66. The battery 64 is configured to selectively supply electrical power to the electrical distribution system 66 independently (e.g., as a single power source for the electrical assembly 24) or in combination with one or more other electrical power sources (e.g., an electrical generator). As will be discussed in further detail, the battery 64 may include a plurality of battery modules (e.g., battery packs), battery cells, and/or the like electrically connected together in series and/or parallel as necessary to configure the battery 64 with the desired electrical characteristics (e.g., voltage output, current output, storage capacity, etc.). The present disclosure is not limited to any particular configuration of the battery 64. The battery 64 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The battery 64 may be disposed, for example, in the aircraft 1000 and/or its propulsion system 20.

During operation of the propulsion system 20 of FIG. 2, ambient air enters the propulsion system 20 through an air intake into and through a core flow path of the engine 22. The ambient air flow along the core flow path is compressed in the compressor section 30 and directed into the combustor 40. Fuel is injected into the combustor 40 (e.g., the combustion chamber 42) and mixed with the compressed air to provide a fuel-air mixture. This fuel-air mixture is ignited, and combustion products thereof flow through the high-pressure turbine section 34A and the power turbine section 34B and are exhausted from the propulsion system 20. The bladed first turbine rotor 54 and the bladed second turbine rotor 58 rotationally drive the first rotational assembly 44 and the second rotational assembly 46, respectively, in response to the combustion gas flow through the high-pressure turbine section 34A and the power turbine section 34B. The second rotational assembly 46 (e.g., the second shaft 56) may drive rotation of the propulsor 26, for example, through the gear box 60. The electric motor 62 may be selectively operated (e.g., by the engine controller 28) to drive rotation of the propulsor 26 independently or in combination with the engine 22 through the gear box 60.

Figure 3:
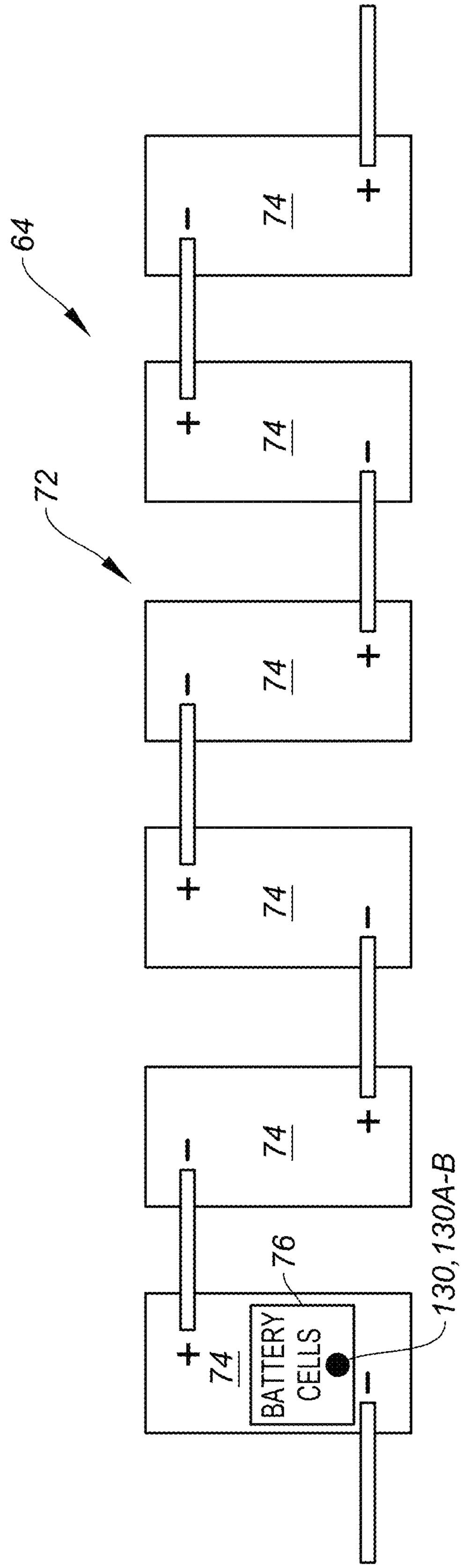
FIG. 3 schematically illustrates a battery string for a battery, in accordance with one or more embodiments of the present disclosure.

FIG. 3 schematically illustrates an exemplary battery string 72 of the battery 64. The battery string 72 of FIG. 3 includes a plurality of battery modules 74 (e.g., battery packs electrically connected in series to form the battery string 72. For example, each battery modules 74 of the battery string 72 may be electrically connected in series (e.g., positive to negative or negative to positive) to one or more other battery modules 74 of the battery string 72. The battery string 72 of FIG. 3 includes six (6) battery modules 74 electrically connected in series. The present disclosure, however, is not limited to any particular number of battery modules 74 for the battery string 72. Each battery module 74 may include a plurality of discrete battery cells 76 electrically connected together (e.g., using series and/or parallel electrical connections) to form the battery module 74, and as necessary to configure the battery string 72 with the desired electrical characteristics (e.g., voltage output, power output, etc.) for the battery 64. The battery cells 76 may be understood to as a smallest discrete unit of the battery 64 configured to convert chemical energy to electrical energy and vice versa (e.g., each of the battery cells 76 may include a cathode, an anode, and an electrolyte). The battery cells 76 may be configured as cylindrical cells, pouch cells, prismatic cells, and the like, and the present disclosure is not limited to any particular configuration of the battery cells 76.

Figure 4:
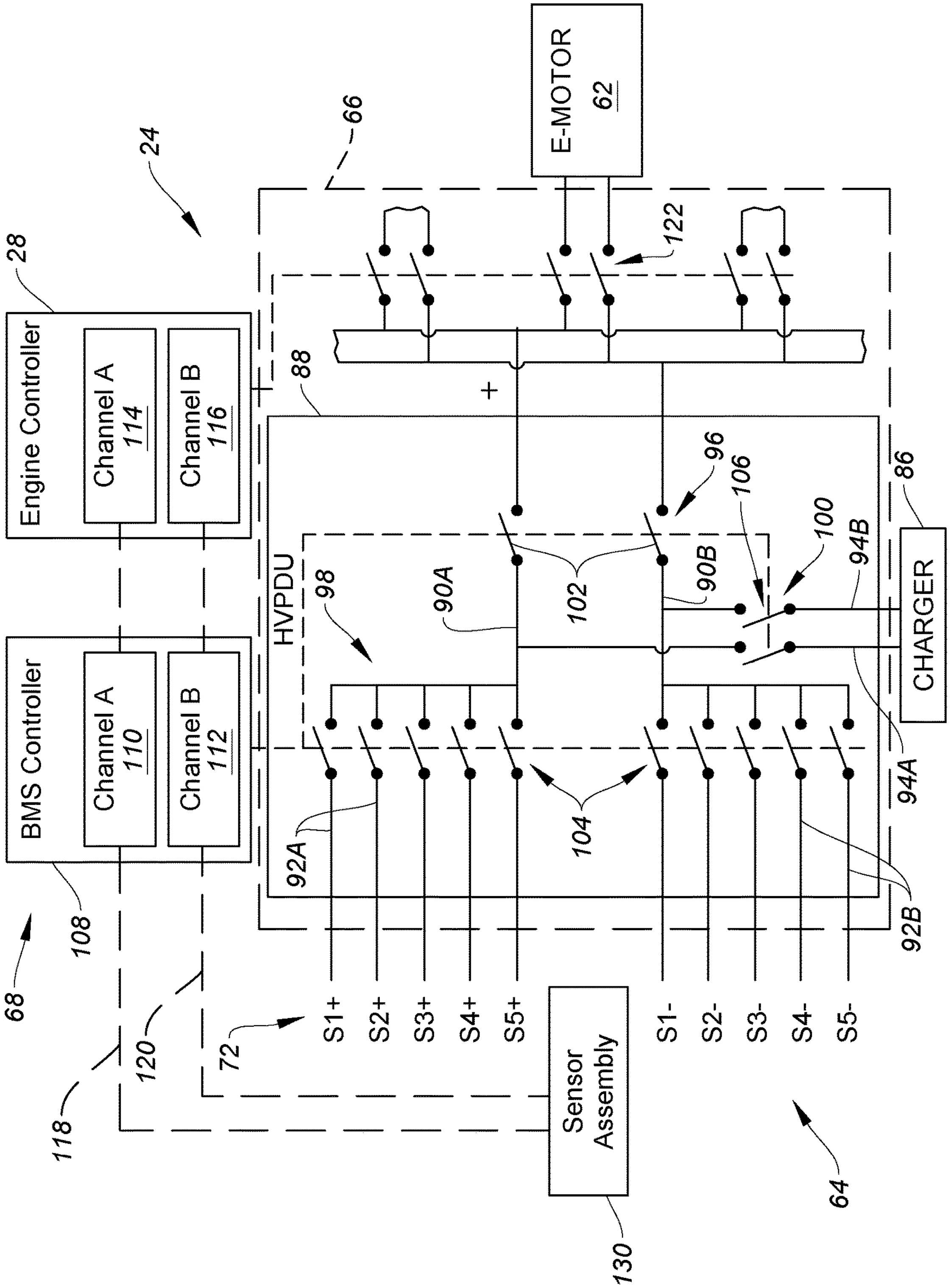
FIG. 4 schematically illustrates an electrical assembly for an aircraft propulsion system, in accordance with one or more embodiments of the present disclosure.

FIG. 4 schematically illustrates a portion of the electrical assembly 24 including the battery 64, the electrical distribution system 66, and the battery management system 68. The electrical assembly 24 is configured to supply electrical power to one or more electrical loads 84 (e.g., the electric motor 62) of the propulsion system 20 and/or the aircraft 1000 (see FIG. 1). The battery 64 of FIG. 4 includes a plurality of the battery strings 72 electrically connected together in parallel, for example, by the electrical distribution system 66. The plurality of battery strings 72 of FIG. 4 includes five (5) battery strings 72, S1-5 electrically connected together in parallel; however, the present disclosure is not limited to any particular quantity of battery strings 72 of the battery 64. The electrical assembly 24 further includes a charger 86 which may be selectively electrically connected with the electrical distribution system 66 to supply electrical power to charge the battery 64 and/or to facilitate operation of the electrical loads 84. The charger 86 may typically be external to the aircraft 1000 (see FIG. 1) and ground based, and may be electrically connected with the electrical distribution system 66 by electrical cables or the like.

The electrical distribution system 66 electrically interconnects components of the electrical assembly 24. The electrical distribution system 66 includes switchgear, cables, wires, breakers, switches, contactors, electrical power conditional and/or conversion (e.g., AC to DC or DC to AC conversion) components, and/or other electrical components to effect the transfer of electrical power between components of the electrical assembly 24. For example, the electrical distribution system 66 of FIG. 2 electrically connects the electric motor 62 (and other electrical loads 84 of the aircraft 1000 and/or the propulsion system 20) with the battery 64 and other electric power sources (e.g., an electrical generator) of the electrical assembly 24. The electrical distribution system 66 may additionally include one or more electrical power controllers, for example, to control a magnitude and/or direction of electrical current flow to components of the electrical assembly 24. The electrical distribution system 66 is configured to supply electrical power to the electrical loads 84 of the aircraft 1000, the propulsion system 20, and/or the engine 22.

The electrical distribution system 66 of FIG. 4 includes a high-voltage power distribution unit (HVPDU) 88. The HVPDU 88 includes a positive main battery line 90A, a negative main battery line 90B, a positive string line 92A and a negative string line 92B for each of the battery strings 72, a positive charger line 94A, and a negative charger line 94B. The main battery lines 90A, 90B electrically interconnect the battery strings 72 with the electrical loads 84 (e.g., at an electrical output of the HVPDU 88). The string battery lines 92A, 92B electrically connect each of the battery strings 72 with the main battery lines 90A, 90B. For example, the positive string lines 92A (e.g., S1+, S2+, S3+, S4+, S5+) are electrically connected together at a positive battery line 90A the negative string lines 92B (e.g., S1−, S2, S3−, S4−, S5−) electrically connected together at the negative battery line 90B to electrically connect the battery strings 72 in parallel. The charger lines 94A, 94B are configured to electrically interconnect the charger 86 with the main battery lines 90A, 90B when the charger 86 is electrically connected with the electrical distribution system 66. The HVPDU 88 further includes a main battery switch assembly 96 for the main battery lines 90A, 90B, a battery string switch assembly 98 for the string lines 92A, 92B, and a charger switch assembly 100 for the charger lines 94A, 94B.

The main battery switch assembly 96, the battery string switch assembly 98, and the charger switch assembly 100 of FIG. 4 each include electrical contactors configured to facilitate selective control of electrical current flow through the HVPDU 88, for example, along the main battery lines 90A, 90B, the string lines 92A, 92B, and the charger lines 94A, 94B. The contactors are selectively configurable (e.g., switchable) in and between a closed position or an open position to conduct or interrupt an electrical current flow, respectively. The contactors may include electrically-controlled relays or switches which may be controlled by an electrical control signal to position the respective contactors in the open position or the closed position. The present disclosure, switch assemblies 96, 98, 100, however, are not limited to electrical contactors and other electrical power interruption devices, breakers, and switches may alternatively be used. The main battery switch assembly 96, the battery string switch assembly 98, and the charger switch assembly 100 of FIG. 4 include main battery contactors 102, string contactors 104, and charger contactors 106 on each of the main battery lines 90A, 90B, the string lines 92A, 92B, and the charger lines 94A, 94B, respectively.

The battery management system 68 includes a BMS controller 108. The BMS controller 108 and/or the engine controller 28 may each be configured as a dual channel controller. For example, the BMS controller 108 of FIG. 4 includes a first control channel 110 ("Channel A") and a second control channel 112 ("Channel B"). The first control channel 110 is connected in signal communication with a first control channel 114 ("Channel A") of the engine controller 28. The second control channel 112 is connected in signal communication with a second control channel 116 ("Channel B) of the engine controller 28. Communication between the first control channel 110 and the first control channel 114 is independent of communication between the second control channel 112 and the second control channel 116. Accordingly, the first control channels 110, 114 may be understood to form a first control lane 118 and the second control channel 112, 116 may be understood to form a second control lane 120 independent of the first control lane 118.

Briefly, the engine controller 28 may control operating parameters of the engine 22 including, but not limited to, fuel flow, stator vane position (e.g., variable compressor inlet guide vane (IGV) position), compressor air bleed valve position, shaft (e.g., first shaft 50 and/or second shaft 56) torque and/or rotation speed, etc. so as to control an engine power or performance of the propulsion system 20. In some embodiments, the engine controller 28 may be part of a full authority digital engine control (FADEC) system for the propulsion system 20 and its engine 22. The engine controller 28 receives signals from the BMS controller 108 to facilitate operation and control of the engine 22 and the electrical assembly 24 by the engine controller 28 or by the engine controller 28 and the BMS controller 108 in combination.

As shown in FIG. 4, the BMS controller 108 may be connected in electrical (e.g., signal) communication with each of the main battery contactors 102 and each of the string contactors 104 to control positions of the main battery contactors 102 and the string contactors 104 in a closed position or an open position. For example, each of the first control channel 110 and the second control channel 112 may be connected in electrical communication with the main battery contactors 102 and the string contactors 104 such that positioning any of the main battery contactors 102 and the string contactors 104 in their respective closed positions requires agreement by the first control channel 110 and the second control channel 112. Electrical contactors for the electrical loads 84, such as electric motor contactors 122 for the electric motor 62, may be controlled by the engine controller 28 to facilitate operation of the electric motor 62 for propulsion.

Figure 5:
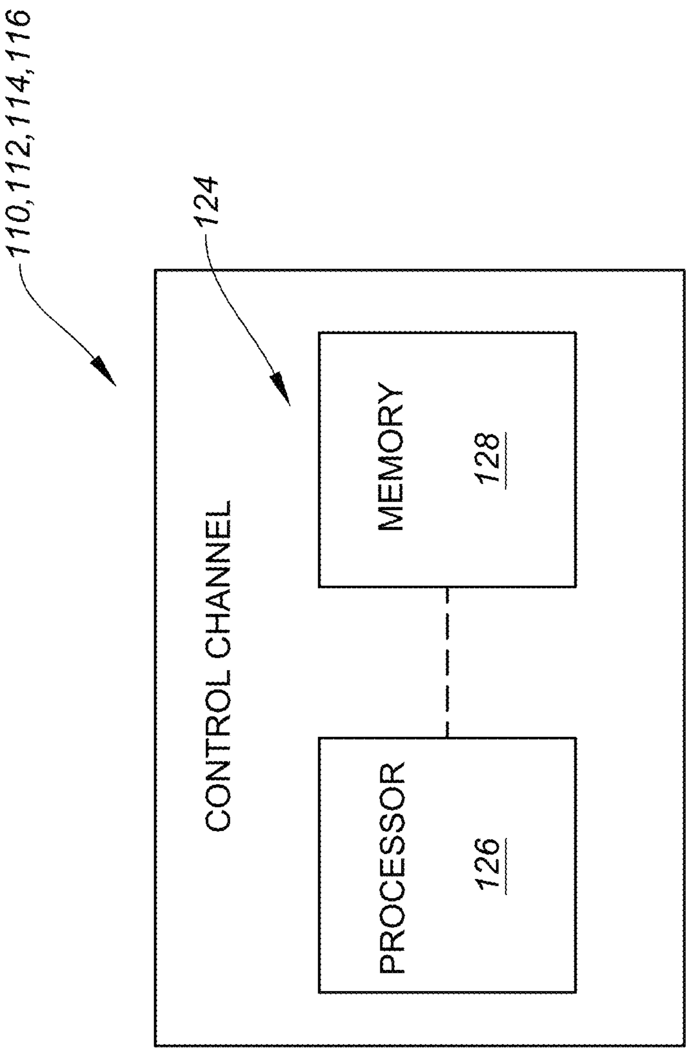
FIG. 5 illustrates a block diagram depicting a control channel, in accordance with one or more embodiments of the present disclosure.

Referring briefly to FIG. 5, each of the control channels 110, 112, 114, 116 includes a discrete processing system 124. The processing system 124 includes a processor 126 connected in signal communication with memory 128. The processor 126 may include any type of computing device, computational circuit, processor(s), central processing unit (CPU), graphics processing unit (GPU), computer, or the like capable of executing a series of instructions that are stored in memory 128. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the processing system 124 and its processor 126 to accomplish the same algorithmically and/or coordination of electrical assembly 24 components including, but not limited to, the electric motor 62, the battery 64, the electric distribution system 66, and the battery management system 68. The memory 128 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the respective one of the engine controller 28 or the BMS controller 108. The processing system 124 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the processing system 124 and external electrical or electronic devices may be via a hardwire connection or via a wireless connection. A person of skill in the art will recognize that portions of the processing system 124 may assume various forms (e.g., digital signal processor, analog device, etc.).

The battery management system 68 and its BMS controller 108 is configured to monitor conditions of the battery 64 such as, but not limited to, charging parameters, discharge parameters, state of charge, state of health, temperature, voltage, current, battery faults, arc discharges, and the like, to facilitate operation and control of the electrical assembly 24 and the battery 64. The battery management system 68 includes a battery sensor assembly 130 connected in signal communication with the BMS controller 108. The battery sensor assembly 130 includes, but is not limited to, battery cell temperature sensors 130A (e.g., for each of the battery cells 76), battery cell voltage sensors 130B (e.g., for each of the battery cells 76), string voltage sensors 130C (e.g., for each of the battery strings 72), battery voltage sensors 130D (e.g., for the battery 64), string current sensors 130E (e.g., for each of the battery strings 72), and battery current sensors 130F (e.g., for the battery 64) (see FIGS. 3, 6, 8, and 9). The sensors of the battery sensor assembly 130, including the sensors 130A-F, may have a redundant sensor arrangement such that each measured parameter of the battery 64 is measured independently by the first control lane 118 and the second control lane 120. For example, each of the battery cells 76 may include a first of the battery cell temperature sensors 130A connected in signal communication with the first control channel 110 and a second of the battery cell temperature sensors 130A connected in signal communication with the second control channel 112. The present disclosure, however, is not limited to the foregoing exemplary configuration of the battery sensor assembly 130.

Figure 6:
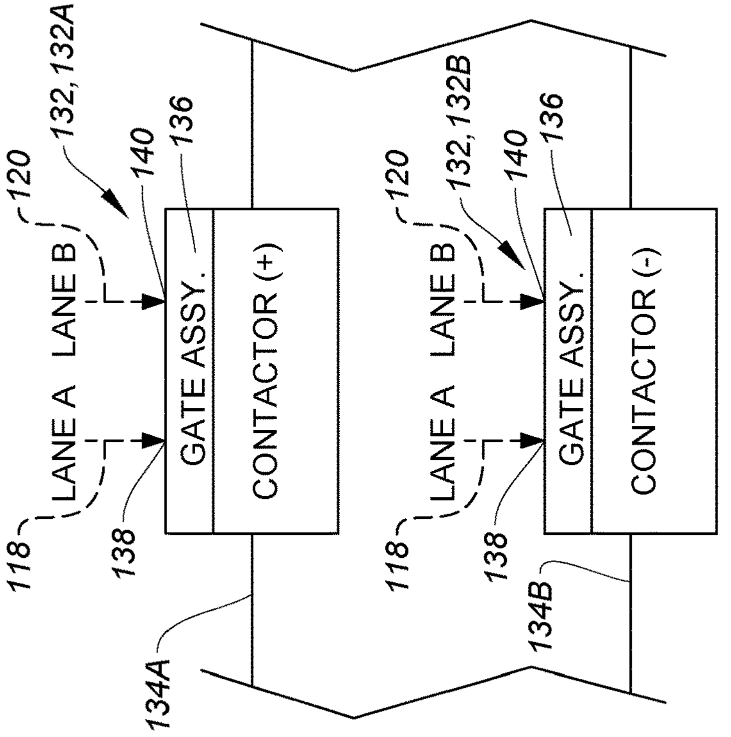
FIG. 6 schematically illustrates an electrical contactor, in accordance with one or more embodiments of the present disclosure.

FIG. 6 schematically illustrates an electrical contactor 132. The string contactors 104 and/or the charger contactors 106, described above, may include the contactor 132 configuration of FIG. 6 (see FIG. 4). However, the present disclosure is not limited to the use of the contactor 132 for the string contactors 104 and/or the charger contactors 106. In particular, FIG. 6 schematically illustrates a positive contactor 132, 132A on a positive line 134A (e.g., the positive string line 92A, the positive charger line 94A, etc.) and a negative contactor 132, 132B on a negative line 134B (e.g., the negative string line 92B, the negative charger line 94B, etc.). The contactor 132 includes a gate assembly 136 configured to receive control signals (e.g., an electrical control current) to facilitate operation of the contactor 132 between its open and closed positions. The gate assembly 136 of FIG. 6 includes a first gate 138 and a second gate 140. The first gate 138 is electrically connected with the first control lane 118 and the second gate 140 is electrically connected with the second control lane 120. For example, the first gate 138 may be electrically connected with the BMS controller 108 (e.g., the first control channel 110) along the first control lane 118 and the second gate 140 may be electrically connected with the BMS controller 108 (e.g., the second control channel 112) along the second control lane 120 (see FIG. 4). The present disclosure, however, is not limited to this foregoing exemplary configuration of the contactor 132 with the BMS controller 108.

In operation, the contactor 132 may be positioned and held in its closed position only by supply of the control signals at the first gate 138 and the second gate 140. For example, the first control channel 110 and the second control channel 112 of the BMS controller 108 may collectively control positioning of the contactor 132 in its closed position by supplying a first control signal from the first control channel 110 to the first gate 138 along the first control lane 118 and independently supplying a second control signal from the second control channel 112 to the second gate 140 along the second control lane 120. In the absence of one or both of the first control signal or the second control signal at the first gate 138 and the second gate 140, respectively, the contactor 132 will remain in or change position to its open position. This configuration of the contactor 132 facilitates redundant and conservative control of the contactor 132 in its closed position, thereby requiring agreement along the first control lane 118 and the second control lane 120 to close the contactor 132 and energize an associated electrical component or system. Accordingly, a failure in one of the first control lane 118 or the second control lane 120 will not cause inadvertent closure or prevent opening (e.g., in response to an electrical fault) of the contactor 132. For example, with additional reference to FIG. 4, upon an occurrence and/or an identification of a detectable fault in the electrical assembly 24 such as, but not limited to, a battery cell overtemperature condition, a battery cell overvoltage condition, an arc discharge, or the like, detected by the first control channel 110 and/or the second control channel 112, the first control channel 110 and/or the second control channel 112 may remove their control signals from the first gate 138 and/or the second gate 140, respectively, thereby causing the contactor 132 to open or to prevent the contactor 132 from closing. For further example, the first control channel 110 and/or the second control channel 112 may identify a fault (e.g., a battery cell overtemperature, a battery cell overvoltage, etc.) in one or more battery cells 76 of one of the battery strings 72 and may remove their control signals from the first gate 138 and/or the second gate 140 of each of the string contactors 104, 132 for the faulted battery string 72, thereby electrically isolating the faulted battery string 72. Similarly, the first control channel 110 and/or the second control channel 112 may identify a fault at the charger 86 or the battery 64 during a charging sequence for the battery 64, and may remove their control signals from the first gate 138 and/or the second gate 140 of each of the charger contactors 106, 132 to electrically isolate the charger 86 from the battery 64.

Figure 7:
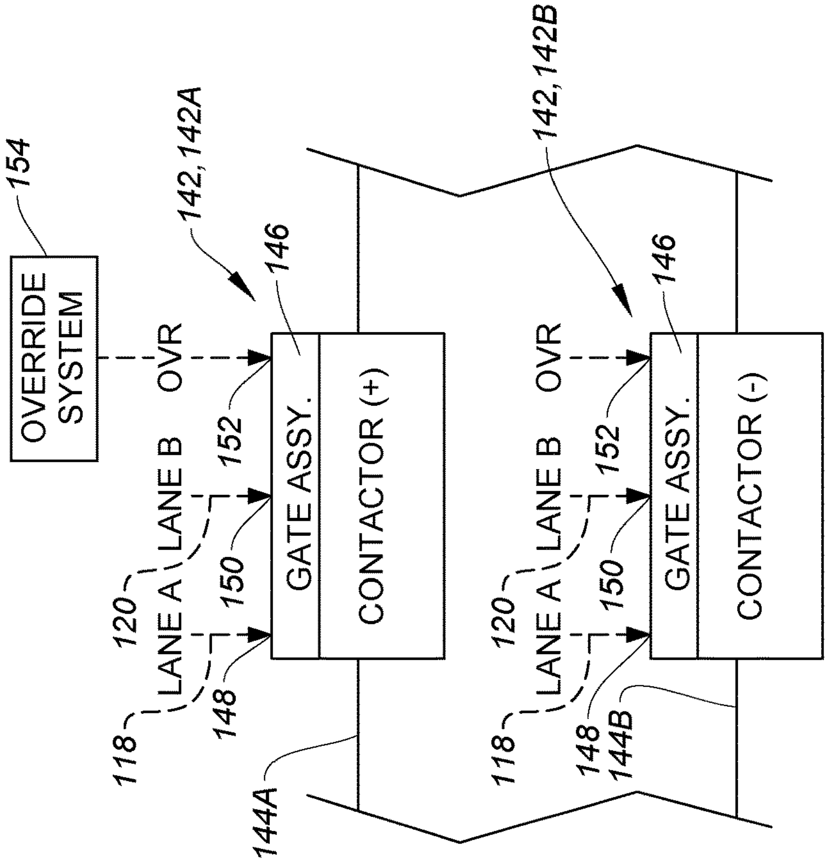
FIG. 7 schematically illustrates another electrical contactor, in accordance with one or more embodiments of the present disclosure.

FIG. 7 schematically illustrates another electrical contactor 142. The string contactors 104 and/or the charger contactors 106, described above, may include the contactor 142 configuration of FIG. 7 (see FIG. 4). However, the present disclosure is not limited to the use of the contactor 142 for the string contactors 104 and/or the charger contactors 106. In particular, FIG. 7 schematically illustrates a positive contactor 142, 142A on a positive line 144A (e.g., the positive string line 92A, the positive charger line 94A, etc.) and a negative contactor 142, 142B on a negative line 144B (e.g., the negative string line 92B, the negative charger line 94B, etc.). The contactor 142 includes a gate assembly 146 configured to receive control signals (e.g., an electrical control current) to facilitate operation of the contactor 132 between its open and closed positions. The gate assembly 146 of FIG. 7 includes a first gate 148, a second gate 150, and a third gate 152. The first gate 148 is electrically connected with the first control lane 118 and the second gate 150 is electrically connected with the second control lane 120. For example, the first gate 148 may be electrically connected with the BMS controller 108 (e.g., the first control channel 110) along the first control lane 118 and the second gate 150 may be electrically connected with the BMS controller 108 (e.g., the second control channel 112) along the second control lane 120 (see FIG. 4). The present disclosure, however, is not limited to this foregoing exemplary configuration of the contactor 142 with the BMS controller 108. The third gate 152 is electrically connected with an override system 154. The override system 154 is configured to apply or remove a control signal (e.g., an electrical control current) to or from the third gate 152 to facilitate operation of the contactor 132 between its open and closed positions independent of the first control lane 118 and the second control lane 120. The override system 154 may one or more override inputs such as, but not limited to, an aircraft cockpit override (e.g., a pilot-operated manual override, a fire handle, etc.), a charger 86 override, an engine controller 28 override, or the like to facilitate operation of the contactor 142 to its open position independent of control line 118, 120 control.

In operation, the contactor 142 may be positioned and held in its closed position only by supply of the control signals at the first gate 148 and the second gate 150 and an absence of the control signal at the third gate 152. For example, the first control channel 110 and the second control channel 112 of the BMS controller 108 may collectively control positioning of the contactor 142 in its closed position, with the override system 154 in a non-override condition, by supplying a first control signal from the first control channel 110 to the first gate 148 along the first control lane 118 and independently supplying a second control signal from the second control channel 112 to the second gate 150 along the second control lane 120. In the non-override condition of the override system 154, no control signal is present at the third gate 152. In the absence of one or both of the first control signal or the second control signal at the first gate 148 and the second gate 150, respectively, the contactor 142 will remain in or change position to its open position. In the presence of the control signal at the third gate 152 (e.g., the override system 154 in an override condition), the contactor 142 will remain in or change position to its open position. This configuration of the contactor 132 facilitates further redundancy and conservative control of the contactor 142 in its closed position (e.g., relative to the contactor 132 of FIG. 6), thereby requiring agreement along the first control lane 118, the second control lane 120, and the override system 154 to close the contactor 142 and energize an associated electrical component or system. Accordingly, a failure in one of the first control lane 118 or the second control lane 120 will not cause inadvertent closure or prevent opening (e.g., in response to a electrical fault) of the contactor 132, and the contactor 142 may still be opened in response to conditions or other occurrences which cannot be detected by the control lanes 118, 120.

Figure 8:
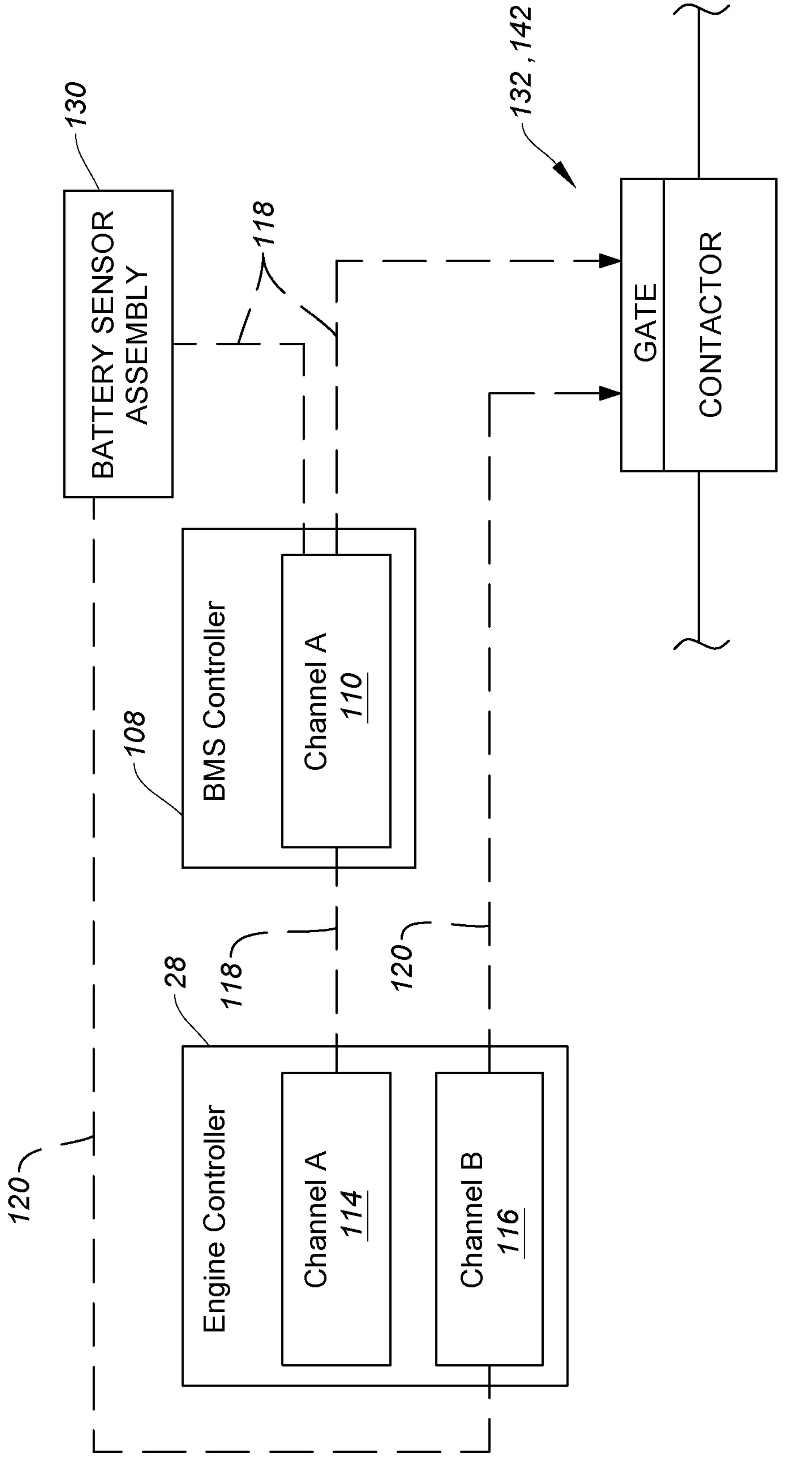
FIG. 8 schematically illustrates an electrical contactor control configuration including a single-channel battery monitoring system (BMS) controller, in accordance with one or more embodiments of the present disclosure.

FIG. 8 schematically illustrates an alternative configuration of the engine controller 28, the BMS controller 108, the first control lane 118, and the second control lane 120. As shown in FIG. 8, the first control channel 110 of the BMS controller 108, the first control channel 114 of the engine controller 28, and the battery sensor assembly 130 (e.g., a first subset of the sensors 130A-F) form the first control lane 118. As also shown in FIG. 8, the second control channel 116 of the engine controller 28 and the battery sensor assembly 130 (e.g., a second subset of the sensors 130A-F) form the second control lane 120, independent of the first control lane 118 and the BMS controller 108. This configuration of the first control lane 118 and the second control lane 120 of FIG. 8 may facilitate redundant control of the contactors 132, 142 (e.g., the string contactors 104 and/or the charger contactors 106), for example, with configurations of the BMS controller 108 which do not include a second control channel (e.g., a single channel controller), thereby facilitating implementation of the present disclosure with existing (e.g., installed) single-channel BMS controllers.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:

a battery including a plurality of battery strings, each of the plurality of battery strings including a plurality of battery cells;

an electrical distribution system including a battery string switch assembly, the battery string switch assembly operable to electrically interconnect each of the plurality of battery strings together in parallel, the battery switch assembly including at least one string contactor for each of the plurality of battery strings, the at least one string contactor positionable in an open position and a closed position, the at least one string contactor including a gate assembly including a first gate and a second gate, the at least one string contactor operable to the closed position with a first control signal present at the first gate and a second control signal present at the second gate, the at least one string contactor operable to the open position with one or both of the first control signal absent at the first gate or the second control signal absent at the second gate;

a first control channel forming a portion of a first control lane connected in signal communication with the first gate, the first control channel operable to selectively apply the first control signal to the first gate;

a second control channel forming a portion of a second control lane, independent of the first control lane, connected in signal communication with the second gate, the second control channel operable to selectively apply the second control signal to the second gate; and a single-channel battery management system (BMS) controller and an engine controller, the single-channel BMS controller includes the first control channel, the engine controller includes the second control channel and a third control channel, and the first control channel is connected in signal communication with the third control channel to further form the first control lane.

2. The propulsion system of claim 1, further comprising an override system, wherein the gate assembly includes a third gate connected in signal communication with the override system, and the override system is operable to selectively apply a third control signal to the third gate.

3. The propulsion system of claim 2, wherein the at least one string contactor is operable to the open position with the third control signal present at the third gate independent of the first control signal and the second control signal present or absent at the first gate and the second gate, respectively.

4. The propulsion system of claim 1, wherein each of the plurality of battery strings includes a positive string line and a negative string line and, for each of the plurality of battery strings, the at least one string contactor includes a positive string contactor at the positive string line and a negative string contactor at the negative string line.

5. The propulsion system of claim 1, further comprising a battery sensor assembly for the battery, the battery sensor assembly including a first subset of battery sensors and a second subset of battery sensors, the first subset of battery sensors connected in signal communication with the first control channel and further forming the first control lane, the second subset of battery sensors connected in signal communication with the second control channel and further forming the second control lane.

6. The propulsion system of claim 5, wherein each of the first control channel and the second control channel includes a processing system, the processing system includes a processor connected in signal communication with a non-transitory memory storing instructions which, when executed by the processor, cause the processor to:

for the first control channel, identify a battery fault of a first battery string of the plurality of battery strings using the first subset of battery sensors and, in response to identification of the battery fault, remove the first control signal from the first gate of the at least one string contactor of the first battery string; and for the second control channel, identify a battery fault of the first battery string of the plurality of battery strings using the second subset of battery sensors and, in response to identification of the battery fault, remove the second control signal from the second gate of the at least one string contactor of the first battery string.

7. The propulsion system of claim 5, wherein each of the first subset of battery sensors and the second subset of battery sensors includes a temperature sensor, a voltage sensor, and a current sensor for each of the plurality of battery strings.

8. The propulsion system of claim 1, further comprising a propulsor and an electric motor, the electric motor is coupled with the propulsor, and the electrical distribution system is configured to electrically interconnect the electric motor with the battery.

9. A propulsion system for an aircraft, the propulsion system comprising:

a battery including a plurality of battery strings, each of the plurality of battery strings including a plurality of battery cells;

an electrical distribution system including a battery string switch assembly, the battery string switch assembly operable to electrically interconnect each of the plurality of battery strings together in parallel, the battery switch assembly including at least one string contactor for each of the plurality of battery strings, the at least one string contactor positionable in an open position and a closed position, the at least one string contactor including a gate assembly including a first gate and a second gate, the at least one string contactor operable to the closed position with a first control signal present at the first gate and a second control signal present at the second gate, the at least one string contactor operable to the open position with one or both of the first control signal absent at the first gate or the second control signal absent at the second gate;

a battery management system including a battery management system (BMS) controller and a battery sensor assembly, the BMS controller including a first control channel, the first control channel and the battery sensor assembly forming a portion of a first control lane connected in signal communication with the first gate, the first control channel operable to selectively apply the first control signal to the first gate;

a second control channel, the second control channel and the battery sensor assembly forming a portion of a second control lane connected in signal communication with the second gate, the second control channel operable to selectively apply the second control signal to the second gate; and an engine controller;

wherein the BMS controller is a single-channel controller, the engine controller includes the second control channel and a third control channel, and the first control channel is connected in signal communication with the third control channel to further form the first control lane.

10. The propulsion system of claim 9, further comprising an override system, wherein the gate assembly includes a third gate connected in signal communication with the override system, and the override system is operable to selectively apply a third control signal to the third gate.

11. The propulsion system of claim 10, wherein the at least one string contactor is operable to the open position with the third control signal present at the third gate independent of the first control signal and the second control signal present or absent at the first gate and the second gate, respectively.

12. A propulsion system for an aircraft, the propulsion system comprising:

a propulsor;

an electric motor coupled with the propulsor;

a battery including a plurality of battery strings, each of the plurality of battery strings including a plurality of battery cells;

an electrical distribution system operable to electrically interconnect the battery with the electric motor, the electrical distribution system including a battery string switch assembly, the battery string switch assembly operable to electrically interconnect each of the plurality of battery strings with the electric motor, the battery switch assembly including at least one string contactor for each of the plurality of battery strings, the at least one string contactor positionable in an open position and a closed position, the at least one string contactor including a gate assembly including a first gate and a second gate, the at least one string contactor operable to the closed position with a first control signal present at the first gate and a second control signal present at the second gate, the at least one string contactor operable to the open position with one or both of the first control signal absent at the first gate or the second control signal absent at the second gate;

a first control channel forming a portion of a first control lane connected in signal communication with the first gate, the first control channel operable to selectively apply the first control signal to the first gate;

a second control channel forming a portion of a second control lane, independent of the first control lane, connected in signal communication with the second gate, the second control channel operable to selectively apply the second control signal to the second gate; and an engine controller and a battery management system (BMS) controller, the BMS controller is a single-channel controller including the first control channel, the engine controller includes the second control channel and a third control channel, and the first control channel is connected in signal communication with the third control channel to further form the first control lane.

13. The propulsion system of claim 12, further comprising an override system, wherein the gate assembly includes a third gate connected in signal communication with the override system, and the override system is operable to selectively apply a third control signal to the third gate.

14. The propulsion system of claim 13, wherein the at least one string contactor is operable to the open position with the third control signal present at the third gate independent of the first control signal and the second control signal present or absent at the first gate and the second gate, respectively.

* * * * *